(12) United States Patent
Liu

(10) Patent No.: US 10,936,088 B1
(45) Date of Patent: Mar. 2, 2021

(54) INTELLIGENT BRIGHTNESS MODULATING DEVICE OF LIGHTS OF GAMING INPUT DEVICE

(71) Applicant: Primax Electronics Ltd., Taipei (TW)

(72) Inventor: Zhou Liu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/696,792

(22) Filed: Nov. 26, 2019

(30) Foreign Application Priority Data

Oct. 23, 2019 (CN) .......................... 201911012969.X

(51) Int. Cl.
| | |
|---|---|
| *G06F 3/033* | (2013.01) |
| *G06F 3/03* | (2006.01) |
| *H05B 45/00* | (2020.01) |
| *H05B 45/12* | (2020.01) |
| *A63F 13/25* | (2014.01) |
| *G06F 3/0354* | (2013.01) |
| *G06F 3/02* | (2006.01) |
| *H05B 45/395* | (2020.01) |

(52) U.S. Cl.
CPC ............ *G06F 3/0308* (2013.01); *A63F 13/25* (2014.09); *G06F 3/02* (2013.01); *G06F 3/03543* (2013.01); *H05B 45/12* (2020.01); *H05B 45/395* (2020.01); *H05B 45/60* (2020.01)

(58) Field of Classification Search
CPC ............ G09G 2360/144; G06F 1/3259; G06F 2203/0337
See application file for complete search history.

(56) References Cited

U.S. PATENT DOCUMENTS

| | | | | |
|---|---|---|---|---|
| 9,704,387 | B1* | 7/2017 | Goodman | G08C 17/02 |
| 2009/0200957 | A1* | 8/2009 | Fukasawa | H05B 45/00 |
| | | | | 315/291 |
| 2010/0315333 | A1* | 12/2010 | Hsu | G06F 3/0383 |
| | | | | 345/157 |
| 2011/0291932 | A1* | 12/2011 | Cao | G06F 3/039 |
| | | | | 345/166 |
| 2015/0263615 | A1* | 9/2015 | Moon | H02M 3/158 |
| | | | | 323/266 |

* cited by examiner

*Primary Examiner* — Sanghyuk Park
(74) *Attorney, Agent, or Firm* — Kirton McConkie; Evan R. Witt

(57) ABSTRACT

Disclosures of the present invention describe an intelligent brightness modulating device for being applied in a gaming input device like a gaming mouse. The intelligent brightness modulating device comprises a photoresistor and a voltage regulating unit. In case of a resistance of the photoresistor varying with an intensity of an ambient light, the voltage regulating unit is adaptively configured for controlling a light driver chip according to the resistance of the photoresistor, such that a driving power of at least one light unit of the gaming mouse is hence correspondingly modulated with the intensity of the ambient light. By using the intelligent brightness modulating device, not only does the gaming mouse be therefore provided with a power saving function, but eyes of a game player are also protected from being stimulated or hurt by a high-intensity light that is radiated from the light unit.

8 Claims, 7 Drawing Sheets

INTELLIGENT BRIGHTNESS MODULATING DEVICE OF LIGHTS OF GAMING INPUT DEVICE

FIELD OF THE INVENTION

The present invention relates to the technology field of gaming input devices, and in particular, to an intelligent brightness modulating device of lights that are radiated from at least one light unit of a specific gaming input device, such as a gaming mouse, a gaming keyboard, or a game controller. This brightness modulating device is configured for adaptively changing a brightness of the lights based an intensity of an ambient light.

BACKGROUND OF THE INVENTION

E-sports is a form of competition sports using video or computer games. With the tremendous growth of e-sports industry in recent years, a variety of e-sports games are designed and proposed by different video game manufacturing companies. Moreover, hardware device manufacturing companies constantly achieve creation and innovation so as to develop new hardware devices. As a result, not only do the newly-designed hardware devices can be applied in e-sports games, but they also attract consumers' attention. One way to achieve creation and innovation of related hardware devices of e-sports games is to make these commonly-used hardware devices have a trait appearance. For example, letting a specific hardware device like gaming mouse, mouse pad, gaming keyboard, or computer case be equipped with at least one light unit, such that the light unit would radiate a gorgeous colored light showing sense of qualitative, technological, and fashionable during the operation of the specific hardware device.

FIG. 1 shows a top view of a conventional gaming mouse having LED lights. The gaming mouse 1' shown in FIG. 1 is disclosed in Taiwan patent No. M391134, wherein the gaming mouse 1' is particularly installed with a plurality of LED lights 11'. Moreover, an LED light controlling unit 10' is accommodated in a housing 12' of the gaming mouse 1', and is disposed on a PCB so as to be electrically connected with the LED lights 11'. It is worth noting that, a photodiode 13' is electrically connected to the LED light controlling unit 10', and is adopted for detecting an intensity of an ambient light. When the intensity of the ambient light reduces to be lower than a first threshold value, the LED light controlling unit 10' supplies a driving current to each of the LED lights 11' via the photodiode 13', thereby driving the LED lights 11' to emit colored lights. On the contrary, in case of the intensity of the ambient light is greater than a second threshold value, the driving current of the LED light controlling unit 10' is cut off by the photodiode 13', such that the LED lights 11' stop the emission of the colored lights.

Briefly speaking, Taiwan patent No. M391134 has disclosed a gaming mouse 1' that is provided with a plurality of LED lights 11' having electricity saving function. As explained more in detail below, the forgoing photodiode 13' functions as a switch that is used for transmitting the driving current from the LED light controlling unit 10' to each of the LED lights 11' in case of the gaming mouse 1' being exposed under a weak-intensity ambient light. Moreover, while the gaming mouse 1' is located in an environment having a high-intensity ambient light, the switch (i.e., photodiode 13') is turn off so as to interrupt the transmission (or flowing) of the driving current.

It needs to know that, most of e-sports players commonly play computer or video games in the nighttime. Particularly, the e-sports players often play games in the still of night in the case of not turning on the room light or merely using a weak light. Therefore, because the photodiode 13' blocks off the transmission (or flowing) of the driving current so as to stop the light emission of each of the LED lights 11' in case of the computer mouse being exposed under a weak ambient light, it is understood that the gaming mouse 1' proposed by Taiwan patent No. M391134 is not suitable for the e-sports players. The primary reason is that, the e-sports players lost the purpose of purchasing the gaming mouse if the purchased gaming mouse fails to emit colored light in an environment having weak ambient light.

From above descriptions, it is understood that there is still room for improvement in the conventional gaming mouse having LED lights. In view of that, inventors of the present application have made great efforts to make inventive research and eventually provided an intelligent brightness modulating device of lights of gaming input device

SUMMARY OF THE INVENTION

A primary objective of the present invention is to provide an intelligent brightness modulating device for being applied in a gaming input device like a gaming mouse. The intelligent brightness modulating device comprises a photoresistor and a voltage regulating unit. In case of a resistance of the photoresistor varying with an intensity of an ambient light, the voltage regulating unit is adaptively configured for controlling a light driver chip according to the resistance of the photoresistor, such that a driving power of at least one light unit of the gaming mouse is hence correspondingly modulated with the intensity of the ambient light. By using the intelligent brightness modulating device, not only does the gaming mouse be therefore provided with a power saving function, but eyes of a game player are also protected from being stimulated or hurt by a high-intensity light that is radiated from the light unit.

To achieve the foregoing objective, the present invention provides one embodiment for the intelligent brightness modulating device, which is applied in a gaming input device that has at least one light unit, and comprises:

a photoresistor, having two electrical terminals and a light sensing portion, wherein the light sensing portion is exposed out of a housing of the gaming input device; and a voltage regulating unit, being electrically connected to the two electrical terminals of the photoresistor, and being also coupled to a power management unit and a light driver unit that are both disposed in the housing of the gaming input device;

wherein a resistance of the photoresistor varies with an intensity of an ambient light, and the voltage regulating unit adaptively modulating a first input voltage supplied by the power management unit to a second input voltage according to a resistance variation of the photoresistor;

wherein the light driver unit receives the second input voltage, and a light driving power of the light driver unit being correspondingly modulated in case of the voltage regulating unit adaptively modulating the first input voltage to the second input voltage, such that the light unit is driven by the light driving power, thereby adaptively adjusting a brightness of a colored light radiated from the least one light unit with an intensity variation of the ambient light.

In the embodiment of the forgoing intelligent brightness modulating device, the gaming input device is selected from the group consisting of gaming mouse, gaming keyboard or game controller.

In the embodiment of the forgoing intelligent brightness modulating device, the light unit comprises at least one lighting element that is selected from the group consisting of LED-based lighting component and OLED-based lighting component.

In the embodiment of the forgoing intelligent brightness modulating device, the light driving power outputted by the light driver unit is a driving voltage or a driving current.

In one embodiment of the intelligent brightness modulating device, the light driving power is adaptively enhanced with an increase of the intensity of the ambient light, such that the brightness of the colored light radiated from the light unit is strengthened by the light driving power.

In another one embodiment of the intelligent brightness modulating device, the light driving power is adaptively lowered with a decrease of the intensity of the ambient light, such that the brightness of the colored light radiated from the light unit is weakened by the light driving power.

In the embodiment of the forgoing intelligent brightness modulating device, the voltage regulating unit comprises:

a low-dropout (LDO) voltage regulator, having a first terminal pin coupled to the first input voltage, a second terminal pin coupled to the first terminal pin, a third terminal pin coupled to the first terminal pin, a fourth terminal pin for outputting the second input voltage, a fifth terminal pin coupled to the fourth terminal pin, and a sixth terminal pin coupled to an electrical ground; wherein the first terminal pin, the second terminal pin and the third terminal pin have a common node, and the first input voltage being transmitted to the common node;

an input capacitor, being coupled between the common node and the electrical ground;

an inductor, being coupled between the common node and the third terminal pin;

a first resistor, being coupled between the fourth terminal pin and the fifth terminal pin;

a second resistor, being coupled between the fifth terminal pin and the sixth terminal pin, and also being electrically connected to the two electrical terminals of the photoresistor in parallel; and an output capacitor, being coupled between the fourth terminal pin and the electrical ground.

In one embodiment of the intelligent brightness modulating device, the power management unit provides the first input voltage after receiving a power that is supplied by a battery.

In another one embodiment of the intelligent brightness modulating device, the power management unit provides the first input voltage after receiving a power supplied by an USB cable that is also electrically connected to a host electronic device.

DETAILED DESCRIPTION OF THE PREFERRED EMBODIMENT

The advantages and features of an intelligent brightness modulating device of lights of gaming input device according to the present invention are described in details with reference to examples of embodiments and accompanying drawings to be more easily understood. However, the present invention may be implemented in different forms, and should not be construed as limited to only embodiments described herein. Conversely, for a person skilled in the art, the embodiments are provided for making the disclosure more thorough and comprehensive and completely conveying the scope of the present invention.

Figure 1:
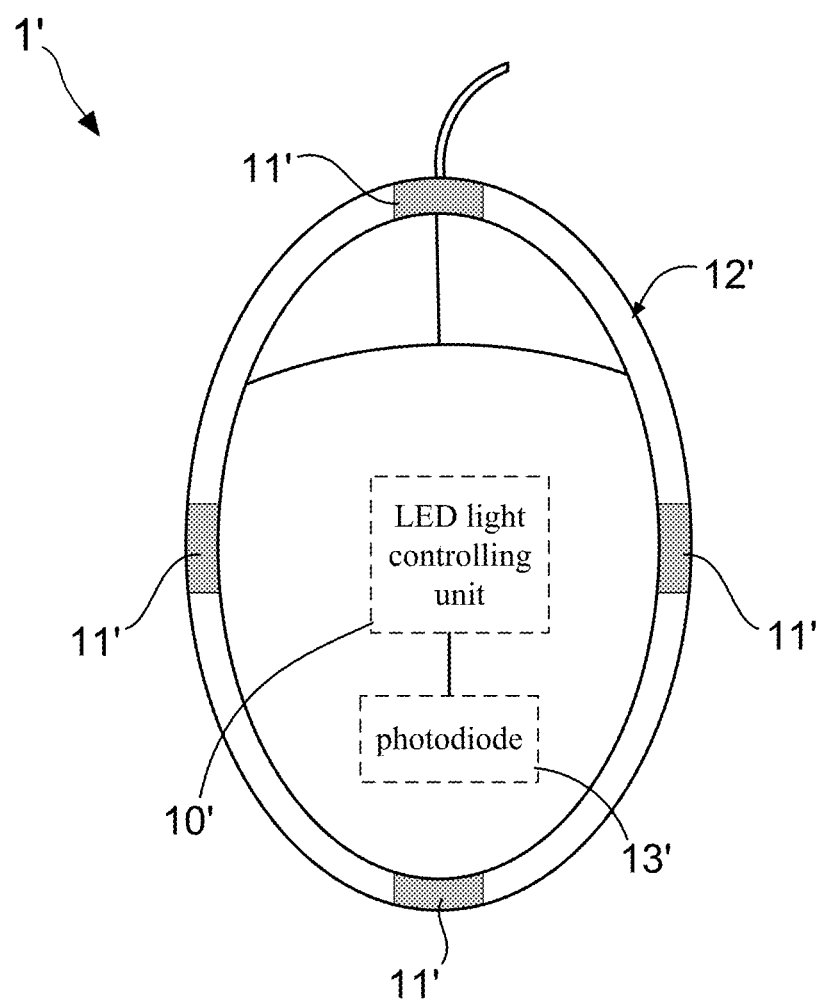
FIG. 1 shows a top view of a conventional gaming mouse having LED lights that is disclosed in Taiwan patent No. M391134.
Figure 2:
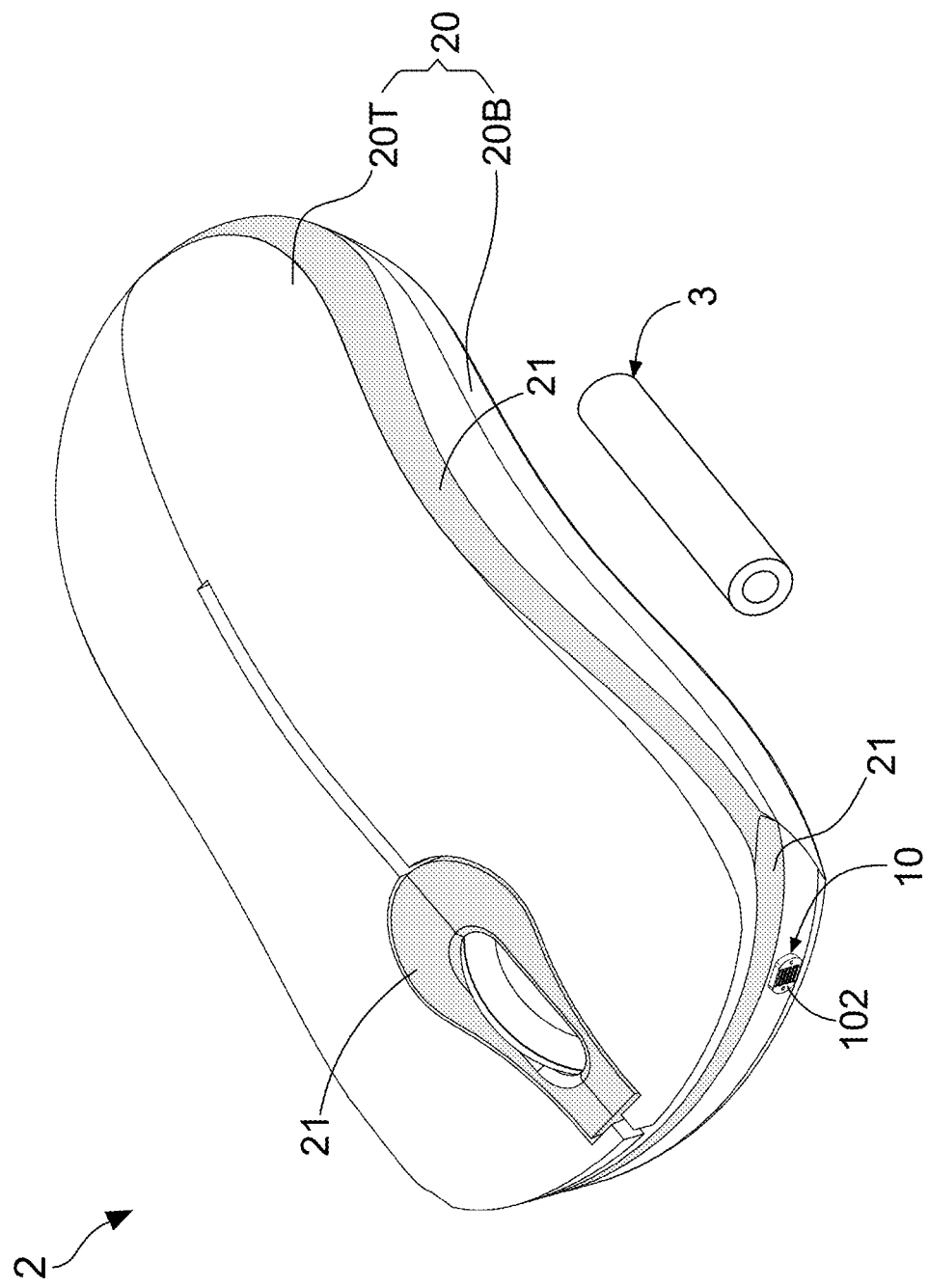
FIG. 2 shows a stereo diagram of one gaming mouse that is installed with an intelligent brightness modulating device of the present invention.
Figure 3:
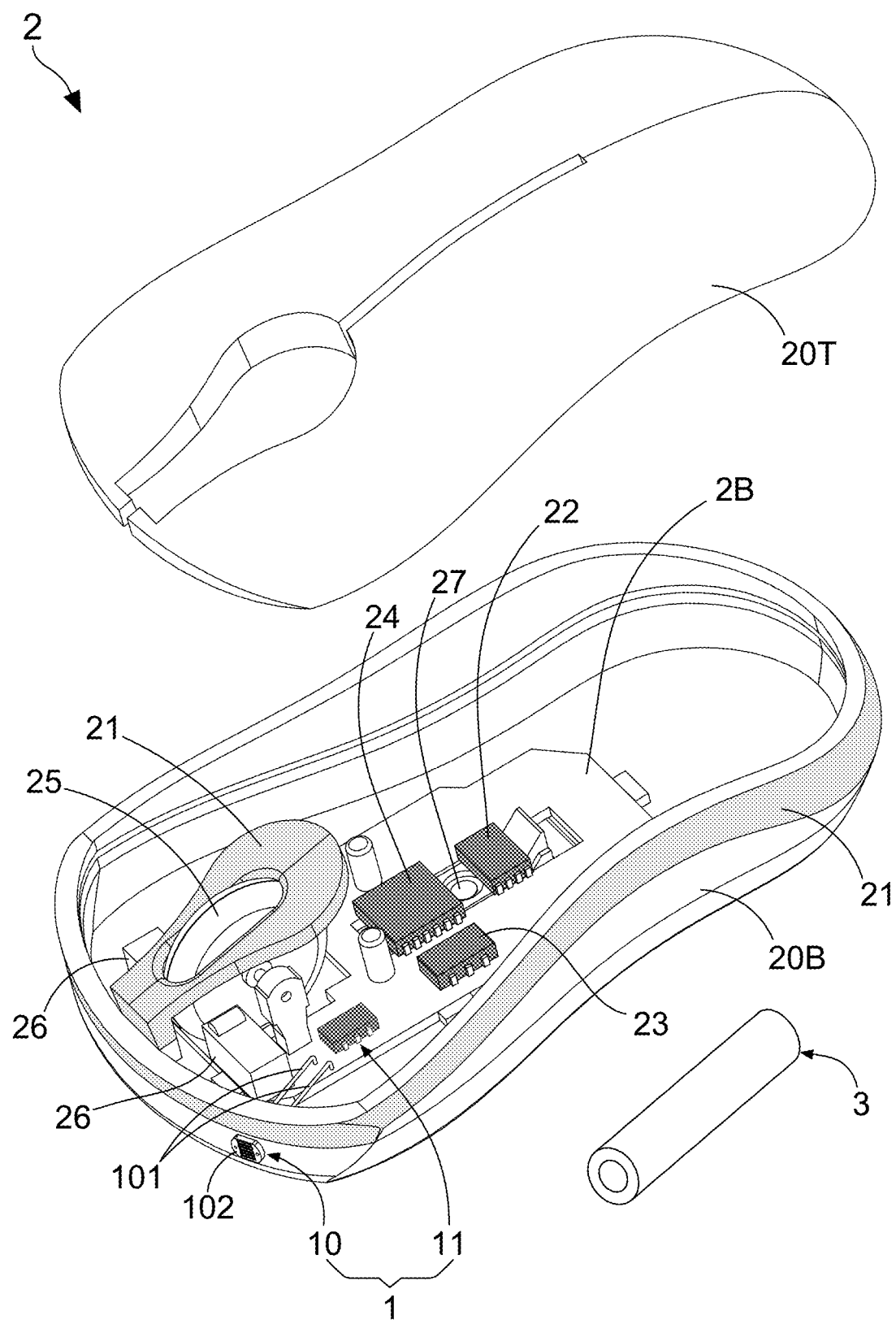
FIG. 3 shows an exploded view of the forgoing gaming mouse.
Figure 4:
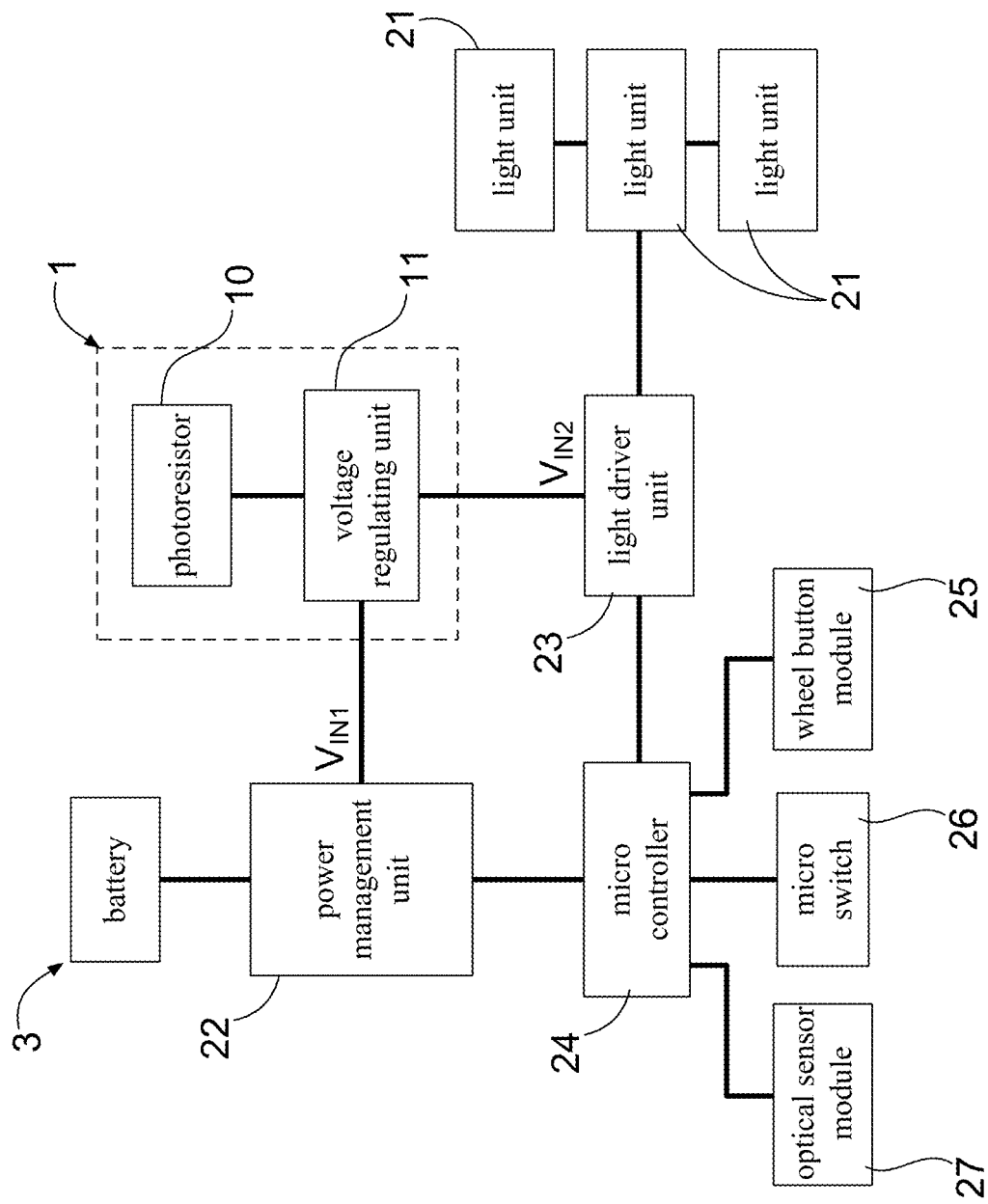
FIG. 4 shows a block diagram of the intelligent brightness modulating device of the present invention.

With reference to FIG. 2, there is provided a stereo diagram of one gaming mouse that is installed with an intelligent brightness modulating device of the present invention. Moreover, FIG. 3 shows an exploded view of the forgoing gaming mouse, and FIG. 4 illustrates a block diagram of the intelligent brightness modulating device of the present invention. According to the present invention, an intelligent brightness modulating device 1 is developed so as to be applied in a gaming input device that has at least one light unit. For example, FIG. 2 and FIG. 3 depicts that the gaming input device is a gaming mouse 2, mainly comprising: a housing 20 consisting of a base 20B and a top cover 20T, a PCB 2B, a plurality of light unit 21, a power management unit 22, a light driver unit 23, a micro controller 24, a wheel button module 25, at least three micro switches 26, and an optical sensor module 27. As FIG. 2 and FIG. 3 show, the intelligent brightness modulating device 1 mainly comprises a photoresistor 10 and a voltage regulating unit 11. In which, the photoresistor 10 has two electrical terminals 101 and a light sensing portion 102, and the light sensing portion 102 is exposed out of a housing 20 of the gaming input device 2. On the other hand, the voltage regulating unit 11 is electrically connected to the two electrical terminals 101 of the photoresistor 10, and is also coupled to the power management unit 22 and the light driver unit 23 that are both disposed in the housing 20 of the gaming mouse 2.

By such arrangements, the light sensing portion 102 of the photoresistor 10 is used for receiving an ambient light, such that a resistance of the photoresistor 10 varies with an intensity of the ambient light. After that, the voltage regulating unit 11 adaptively modulating a first input voltage $V_{IN1}$ supplied by the power management unit 22 to a second input voltage $V_{IN2}$ according to a resistance variation of the photoresistor 10. Consequently, the light driver unit 23 receives the second input voltage $V_{IN2}$ from the voltage regulating unit 11. It is worth explaining that, a light driving power of the light driver unit 23 is correspondingly modulated in case of the voltage regulating unit 11 adaptively modulating the first input voltage $V_{IN1}$ to the second input voltage $V_{IN2}$, such that the light unit 21 is driven by the light driving power, thereby adaptively adjusting a brightness of a colored light radiated from the least one light unit 21 with an intensity variation of the ambient light.

Figure 5:
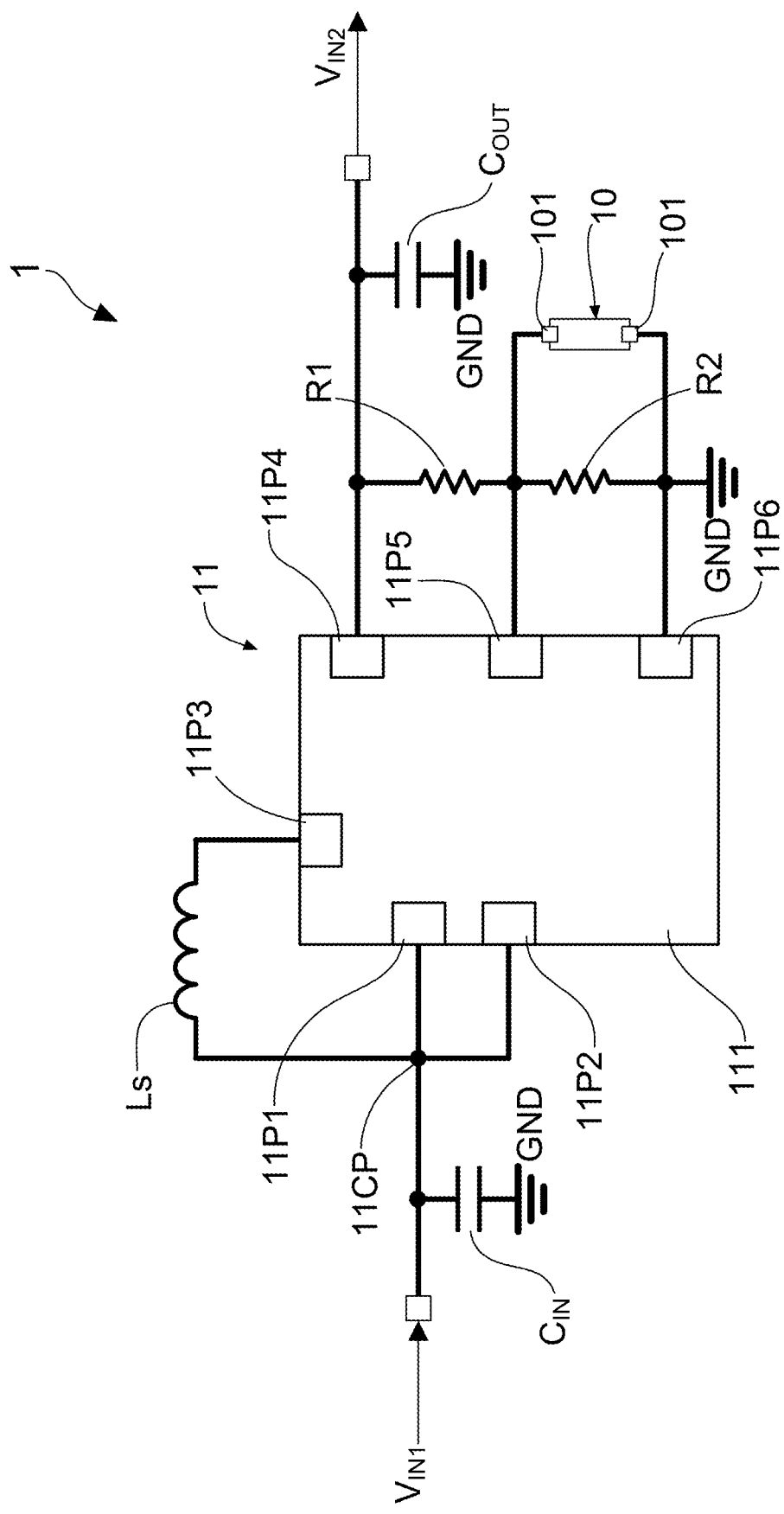
FIG. 5 shows a first circuit topology diagram of the intelligent brightness modulating device of the present invention.

Referring to FIG. 3 and FIG. 4 again, and please simultaneously refer to FIG. 5, which illustrates a first circuit topology diagram of the intelligent brightness modulating device of the present invention. According to the design of the present invention, the voltage regulating unit 11 comprises: a low-dropout (LDO) voltage regulator 111, an input capacitor $C_{IN}$, an inductor Ls, a first resistor R1, a second resistor R2, and an output capacitor $C_{OUT}$. As FIG. 5 shows, the low-dropout (LDO) voltage regulator 111 having a first terminal pin 11P1, a second terminal pin 11P2, a third terminal pin 11P3, a fourth terminal pin 11P4, a fifth terminal pin 11P5, and a sixth terminal pin 11P6. In which, the first terminal pin 11P1 is a terminal pin for receiving the first input voltage $V_{IN1}$ that is supplied by the power management unit 22. It is worth explaining that, FIG. 3 and FIG. 4 depict that the power management unit 22 provides the first input voltage $V_{IN1}$ after receiving a power that is supplied by a (lithium-ion) battery 3.

As explained more in detail below, the second terminal pin 11P2 is a terminal pin for receiving an enable signal, and is also coupled to the first terminal pin 11P1. Moreover, the third terminal pin 11P3 is a terminal pin for receiving switch controlling signal, and is also coupled to the first terminal pin 11P1. As FIG. 5 shows, the first terminal pin 11P1, the second terminal pin 11P2 and the third terminal pin 11P3 have a common node, and the first input voltage $V_{IN1}$ is transmitted to the common node. On the other hand, the fourth terminal pin 11P4 is a terminal pin for outputting the second input voltage $V_{IN2}$, and the fifth terminal pin 11P5 is coupled to the fourth terminal pin 11P4, so as to be used as a terminal pin for receiving a feedback signal from the fourth terminal pin 11P4. In addition, the sixth terminal pin 11P6 coupled to an electrical ground GND. Moreover, the input capacitor $C_{IN}$ is coupled between the common node and the electrical ground GND, the inductor Ls is coupled between the common node and the third terminal pin 11P3, the first resistor R1 is coupled between the fourth terminal pin 11P4 and the fifth terminal pin 11P5, and the output capacitor $C_{OUT}$ is coupled between the fourth terminal pin 11P4 and the electrical ground GND. From FIG. 5, it is further depicted that the second resistor R2 is coupled between the fifth terminal pin 11P5 and the sixth terminal pin 11P6, and is also electrically connected to the two electrical terminals 101 of the photoresistor 10 in parallel.

It needs to further explain that, the first resistor R1 and the second resistor R2 constitute a voltage detecting unit, which is configured for detecting the second input voltage $V_{IN2}$ that is outputted from the fourth terminal pin 11P4. Moreover, the second resistor R2 is also electrically connected to the two electrical terminals 101 of the photoresistor 10 in parallel. By such arrangements, while the intensity of the ambient light is steady or does not has a considerable variation, the resistance of the photoresistor 10 is kept at a specific value, such that the LDO voltage regulator 111 adaptively modulates the second input voltage $V_{IN2}$ (i.e., an output voltage of the LDO voltage regulator 111) according to a feedback signal (i.e., a voltage detection signal provided by the voltage detecting unit), thereby enabling the light driver unit 23 transmitting a light driving power to the light unit 21. However, in case of there being an increase of the intensity of the ambient light, the light driving power of the light driver unit 23 is adaptively enhanced by the LDO voltage regulator 111, and then the brightness of the colored light radiated from the light unit 21 is strengthened by the light driving power. On the contrary, the light driving power is adaptively lowered with a decrease of the intensity of the ambient light, such that the brightness of the colored light radiated from the light unit 21 is weakened by the light driving power.

In general, the light unit 21 comprises at least one lighting element that can be an LED-based lighting component and an OLED-based lighting component. Therefore, the light unit 21 is commonly driven to emit a colored light by a driving voltage or a driving current. Briefly speaking, the light driving power outputted by the light driver unit 23 is a driving voltage or a driving current. In other words, when the intelligent brightness modulating device 1 is applied in a gaming mouse 2 and normally works, the LDO voltage regulator 111 control the light driver unit 23 to adjust the driving voltage or the driving current according to a resistance variation of the photoresistor 10, thereby using the modulated light driving signal to make the colored light that is radiated from the light unit 21 be adaptively adjusted with the intensity variation of the ambient light.

From above descriptions, it is understood that, the intelligent brightness modulating device 1 of the present invention is particularly configured for strengthening the brightness of the colored light radiated from the light unit 21 while the gaming mouse 2 is located in one environment having high-intensity ambient light. Moreover, in case of the gaming mouse 2 is located in another one environment having weak-intensity ambient light, the intelligent brightness modulating device 1 of the present invention would achieve a down adjustment for the brightness of the colored light radiated from the light unit 21. By using the intelligent brightness modulating device 1, not only does the gaming mouse 2 be therefore provided with a power saving function, but eyes of a e-sports players are also protected from being stimulated or hurt by a high-intensity light that is radiated from the light unit 21. Besides, the power saving function is helpful in extending the battery service life.

Figure 6:
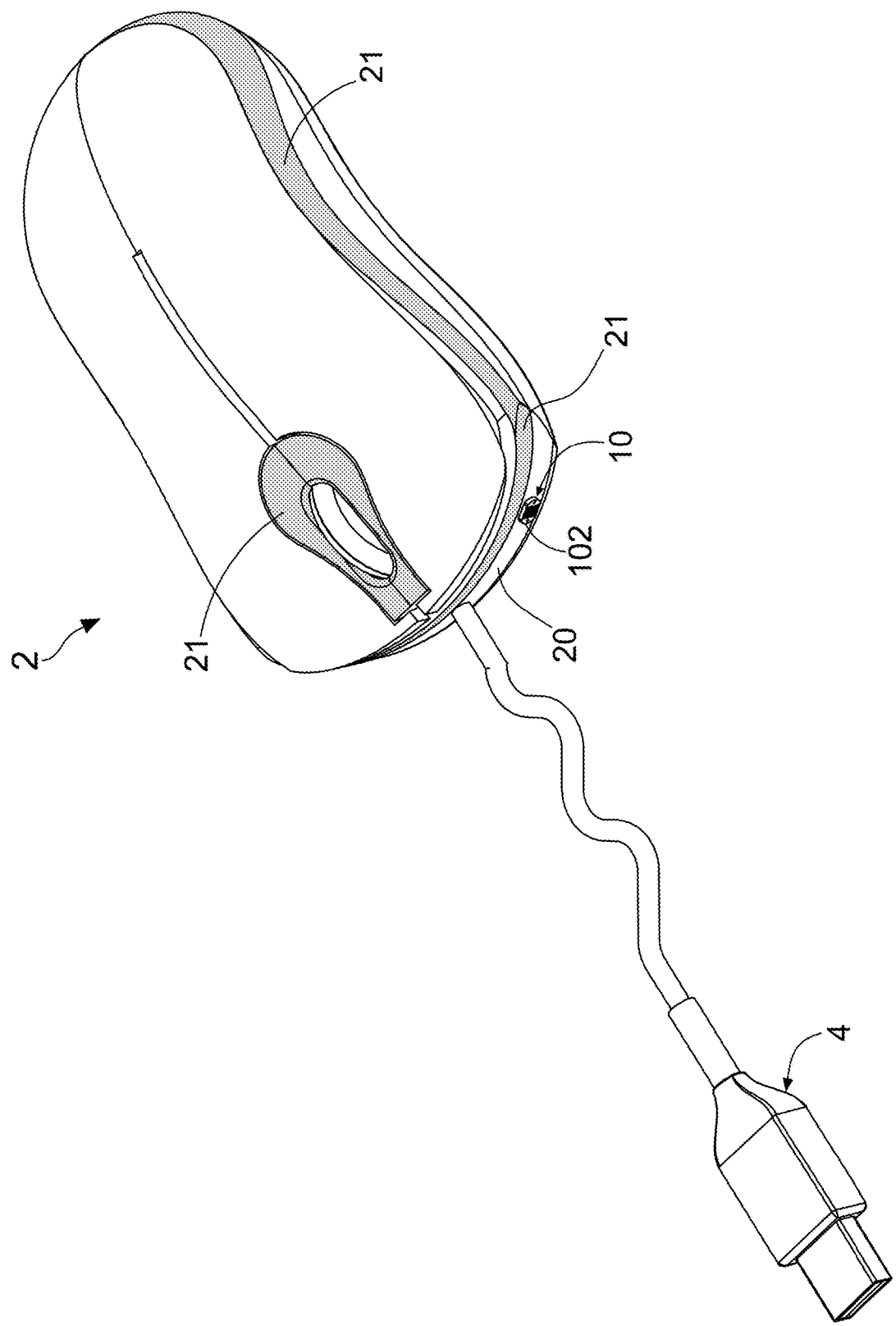
FIG. 6 shows a stereo diagram of another one gaming mouse that is installed with the intelligent brightness modulating device of the present invention.
Figure 7:
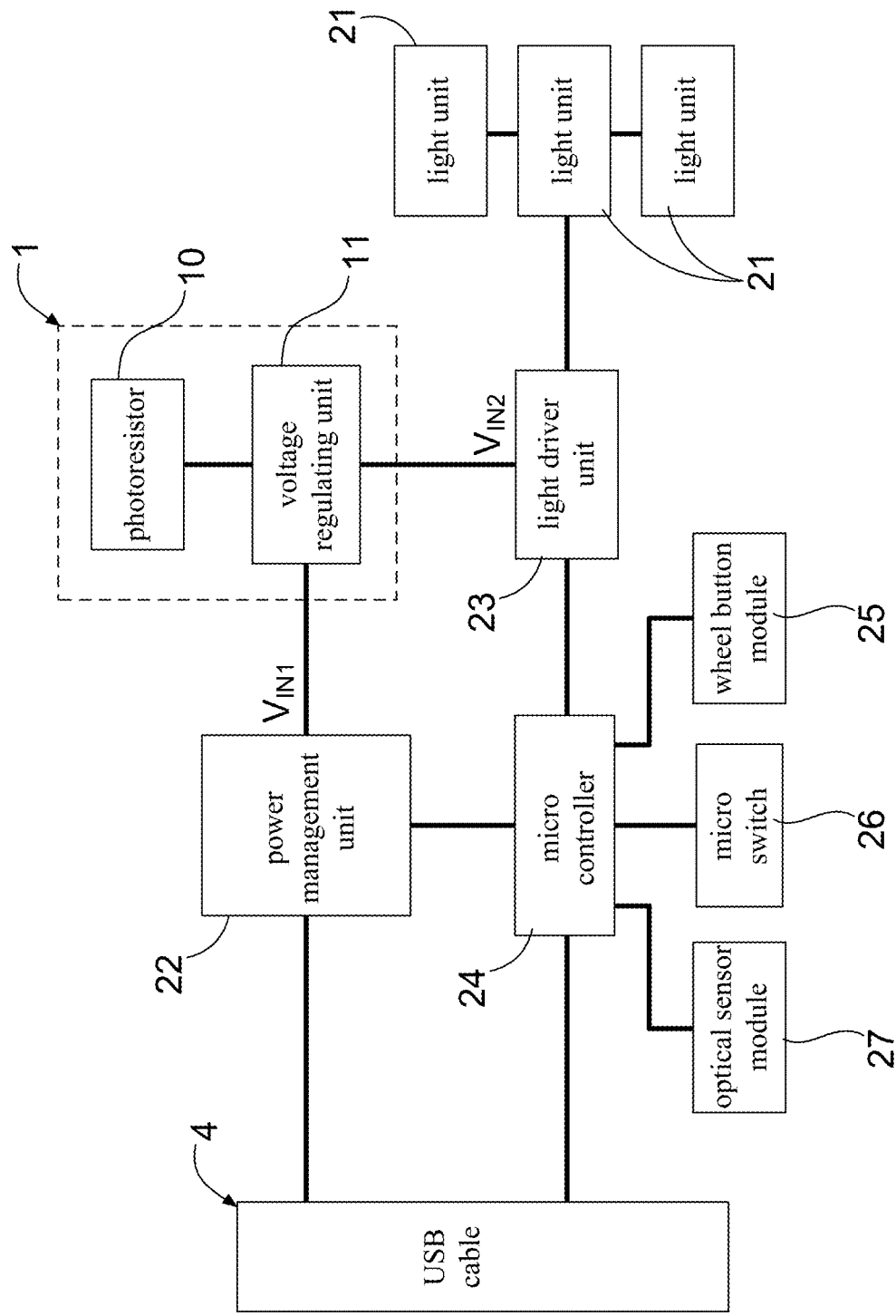
FIG. 7 shows a second circuit topology diagram of the intelligent brightness modulating device of the present invention.

FIG. 6 shows a stereo diagram of another one gaming mouse that is installed with the intelligent brightness modulating device of the present invention, and FIG. 7 illustrate a second circuit topology diagram of the intelligent brightness modulating device of the present invention. The forgoing FIG. 2 depicts a wireless gaming mouse 2, wherein the power of the gaming mouse 2 is supplied by a battery 3. After comparing FIG. 6 with FIG. 2, it is easy to understand that, FIG. 6 also depicts gaming mouse 2, wherein the gaming mouse 2 is coupled to a host electronic device through an USB cable 4. Therefore, the power management unit 22 of the wired gaming mouse 2 provides the first input voltage $V_{IN1}$ after receiving a power supplied by the USB cable 4 that also electrically connected to the host electronic device. FIG. 7 also depicts that the USB cable 4 is coupled to the power management unit 22 and the micro controller 24. By such arrangements, the USB cable 4 would constantly supply a 5 volt voltage to the power management unit 22 under the USB cable 4 being electrically connected to the host electronic device. In general, the power management unit 22 comprises a battery charging chip and a voltage regulator chip, wherein the battery charging chip uses the 5 volt voltage to charge the (lithium-ion) battery 3, and the voltage regulator chip converts the 5 volt voltage to a system voltage for biasing the micro controller 24 and the voltage regulating unit 11 of the intelligent brightness modulating device 1. It should be understood that, the forgoing system voltage is the said first voltage input voltage $V_{IN1}$.

Briefly speaking, the intelligent brightness modulating device 1 can be applied in a wireless gaming mouse 2 or a wired gaming mouse 2. Furthermore, the intelligent brightness modulating device 1 of the present invention can also be applied in other gaming input device like gaming keyboard or game controller.

Any modification to the present invention made by a person skilled in the art does not depart from the protection scope defined by the appended claims.

What is claimed is:

1. An intelligent brightness modulating device, being applied in a gaming input device that has at least one light unit, and comprising:
    a photoresistor, having two electrical terminals and a light sensing portion, wherein the light sensing portion is exposed out of a housing of the gaming input device; and
    a voltage regulating unit, being electrically connected to the two electrical terminals of the photoresistor, and being also coupled to a power management unit and a light driver unit that are both disposed in the housing of the gaming input device, wherein the voltage regulating unit comprises:
        a low-dropout (LDO) voltage regulator, having a first terminal pin coupled to the first input voltage, a second terminal pin coupled to the first terminal pin, a third terminal pin coupled to the first terminal pin, a fourth terminal pin for outputting the second input voltage, a fifth terminal pin coupled to the fourth terminal pin, and a sixth terminal pin coupled to an electrical ground; wherein the first terminal pin, the second terminal pin and the third terminal pin have a common node, and the first input voltage being transmitted to the common node;
        an input capacitor, being coupled between the common node and the electrical ground;
        an inductor, being coupled between the common node and the third terminal pin;
        a first resistor, being coupled between the fourth terminal pin and the fifth terminal pin;
        a second resistor, being coupled between the fifth terminal pin and the sixth terminal pin, and being also electrically connected to the two electrical terminals of the photoresistor in parallel; and
        an output capacitor, being coupled between the fourth terminal pin and the electrical ground;
    wherein a resistance of the photoresistor varies with an intensity of an ambient light, and the voltage regulating unit adaptively modulating a first input voltage supplied by the power management unit to a second input voltage according to a resistance variation of the photoresistor;
    wherein the light driver unit receives the second input voltage, and a light driving power of the light driver unit being correspondingly modulated in case of the voltage regulating unit adaptively modulating the first input voltage; to the second input voltage, such that the at least one light unit is driven by the light driving power, thereby adaptively adjusting a brightness of a colored light radiated from the at least one light unit with an intensity variation of the ambient light.

2. The intelligent brightness modulating device according to claim 1, wherein the gaming input device is selected from the group consisting of gaming mouse, gaming keyboard or game controller.

3. The intelligent brightness modulating device according to claim 1, wherein the at least one light unit comprises at least one lighting element that is selected from the group consisting of LED-based lighting component and OLED-based lighting component.

4. The intelligent brightness modulating device according to claim 1, wherein the light driving power outputted by the light driver unit is a driving voltage or a driving current.

5. The intelligent brightness modulating device according to claim 1, wherein the light driving power is adaptively enhanced with an increase of the intensity of the ambient light, such that the brightness of the colored light radiated from the at least one light unit is strengthened by the light driving power.

6. The intelligent brightness modulating device according to claim 1, wherein the light driving power is adaptively lowered with a decrease of the intensity of the ambient light, such that the brightness of the colored light radiated from the at least one light unit is weakened by the light driving power.

7. The intelligent brightness modulating device according to claim 1, wherein the power management unit provides the first input voltage after receiving a power that is supplied by a battery.

8. The intelligent brightness modulating device according to claim 1, wherein the power management unit provides the first input voltage after receiving a power supplied by an USB cable that is also electrically connected to a host electronic device.

* * * * *